United States Patent
O'Donnell et al.

(10) Patent No.: US 10,479,735 B2
(45) Date of Patent: Nov. 19, 2019

(54) PROCESS TO PRODUCE A COMMERCIAL SOIL ADDITIVE PREPARED FROM COMPOST AND IN SITU OXIDIZED SULPHUR AND SOIL ADDITIVE SO FORMED

(71) Applicant: BIO-CAN LTD., Okotoks, Alberta (CA)

(72) Inventors: Charles O'Donnell, Calgary (CA); Neil Wiens, Calgary (CA); Jeffrey Thompson, Calgary (CA)

(73) Assignee: GFL ENVIRONMENTAL INC., Toronto (CA)

( * ) Notice: Subject to any disclaimer, the term of this patent is extended or adjusted under 35 U.S.C. 154(b) by 87 days.

(21) Appl. No.: 15/504,829

(22) PCT Filed: Aug. 19, 2015

(86) PCT No.: PCT/CA2015/000473
§ 371 (c)(1),
(2) Date: Feb. 17, 2017

(87) PCT Pub. No.: WO2016/026026
PCT Pub. Date: Feb. 25, 2016

(65) Prior Publication Data
US 2017/0240479 A1   Aug. 24, 2017

Related U.S. Application Data

(60) Provisional application No. 62/039,060, filed on Aug. 19, 2014.

(51) Int. Cl.
*C05D 9/00* (2006.01)
*C05F 17/00* (2006.01)
(Continued)

(52) U.S. Cl.
CPC ............... *C05D 9/00* (2013.01); *C05B 17/00* (2013.01); *C05D 9/02* (2013.01); *C05F 11/00* (2013.01);
(Continued)

(58) Field of Classification Search
None
See application file for complete search history.

(56) References Cited

U.S. PATENT DOCUMENTS 3,963,470 A * 6/1976 Haug ................... C05F 17/0018
71/9
4,397,674 A * 8/1983 Laughbaum ............ C05F 17/02
366/345
(Continued)

FOREIGN PATENT DOCUMENTS

CN 103420744 A 12/2013
CN 103787797 A 5/2014

OTHER PUBLICATIONS

Written Opinion of the International Searching Authority dated Nov. 24, 2015 for PCT/CA2015/000473.
(Continued)

*Primary Examiner* — Wayne A Langel
(74) *Attorney, Agent, or Firm* — Kevin E. West; Advent, LLP

(57) ABSTRACT

A process for producing a commercial soil additive comprises mixing a compost composition with elementary (raw) sulphur to form a mixed material and turning the mixed material until it is substantially homogenous and until there is microbial oxidation of elementary sulphur therein to at least one sulphate.

6 Claims, 2 Drawing Sheets

(51) Int. Cl.
  *C05B 17/00* (2006.01)
  *C05D 9/02* (2006.01)
  *C05F 11/00* (2006.01)
  *C05F 11/02* (2006.01)
  *C05F 17/02* (2006.01)

(52) U.S. Cl.
  CPC .......... *C05F 17/00* (2013.01); *C05F 17/0036* (2013.01); *C05F 17/0063* (2013.01); *C05F 17/02* (2013.01); *C05F 17/027* (2013.01); *C05F 17/0258* (2013.01); *C05F 11/02* (2013.01); *Y02P 20/145* (2015.11); *Y02W 30/43* (2015.05)

(56) References Cited

U.S. PATENT DOCUMENTS

| | | | | | |
|---|---|---|---|---|---|
| 5,118,336 | A | * | 6/1992 | Biez | C05F 3/00 71/21 |
| 5,184,780 | A | * | 2/1993 | Wiens | B03B 9/06 241/19 |
| 5,191,754 | A | * | 3/1993 | Morey | A01D 84/00 56/12.8 |
| 5,567,220 | A | * | 10/1996 | Thorpe | C05F 1/002 71/9 |
| 2002/0019045 | A1 | * | 2/2002 | Bisbis | C05F 17/0258 435/290.1 |
| 2011/0151553 | A1 | * | 6/2011 | Cruson | C05F 17/0205 435/290.2 |
| 2012/0279266 | A1 | * | 11/2012 | Van Dyke | C05F 9/04 71/21 |
| 2014/0338411 | A1 | * | 11/2014 | Nunn | C05F 3/06 71/9 |
| 2015/0121978 | A1 | * | 5/2015 | Johannesson | C05F 9/02 71/14 |

OTHER PUBLICATIONS

Atland et al., "Use of Switchgrass as a Nursery Container Substrate", Hort Technology, 2010, 20(6), pp. 950-956.

Carrion et al., "Acidifying Composts from Vegetable Crop Wastes to Prepare Growing Media for Containerized Crops", Compost Science & Utilization, 2008, 16(1), pp. 20-29 (Abstract).

Garcia De La Fuente et al., "Biological oxidation of elemental sulphur added to three composts from different feedstocks to reduce their pH for horticultural purposes", Bioresource Technology, 2007, 98, pp. 3561-3569.

Gu et al., "Effects of sulphur and Thiobacillus thioparus on cow manure aerobic composting", Bioresource Technology, 2011, 102, pp. 6529-6535 (Abstract).

Roig et al., "The use of elemental sulphur as organic alternative to control pH during composting of olive mill wastes", Chemosphere, 2004, 57, pp. 1099-1105 (Abstract).

Semida et al., "A Novel Organo-Mineral Fertilizer Can Alleviate Negative Effects of Salinity Stress for Eggplant Production on Reclaimed Saline Calcareous Soil", Acta Hort, 2014, 1034, pp. 493-499.

* cited by examiner

PROCESS TO PRODUCE A COMMERCIAL SOIL ADDITIVE PREPARED FROM COMPOST AND IN SITU OXIDIZED SULPHUR AND SOIL ADDITIVE SO FORMED

FIELD OF THE INVENTION

This invention relates to the field of soil amendments and additives.

BACKGROUND OF THE INVENTION

Soil additives may be used to improve soil quality in these areas as well as broader agriculture applications. For years, soils have been studied to determine which types of soils are best suited to grow which types of plants. From this analysis, it has been determined that different types of crops and other plants grow best in certain types of soils. In order to prepare a plot of soil to have the desired plant supporting features, soil amendments are formulated and added to soils. A wide variety of materials have been used in various mixtures to attempt to achieve these desired results.

Additives have been mixed with soil to assist the soil in performing a variety of functions including retaining water and moisture, elevating soil temperature, controlling weeds, adding nutrients, allowing water to drain from the soil, controlling pests such as insects, bacteria and fungi, and other functions that are required for or conducive to supporting plant growth. The amount of these materials that are to be added to the soil is determined by a combination of the amount of the types of plants to be raised, the desired characteristics of the soil, and the existing characteristics of the soil prior to the addition of any amendments.

One way of amending the soil to improve soil conditions is to use a chemical fertilizer application. Such chemical fertilizer applications are available in a variety of forms. One of the most common forms being a spray wherein the fertilizer is suspended in a liquid and then applied to plants or soils. The addition of commercial fertilizers to a soil while providing the soil with an increased amount of one or several nutrients also depletes the soil of other nutrients and minerals. Over time, the composition of the soil becomes depleted and additional amendments to the soil are required. As a result, plants utilizing the chemical fertilizer deplete the soil of other resources and become stagnated, therefore unable to achieve their full potential. Another negative aspect of chemical fertilizers, and other man-made chemical compositions is that many times these are made of petroleum and other chemical based products that deplete natural resources and place unnatural and non-biodegradable materials into the soil.

Optimizing the sulphur nutrition of crops is a key to achieving crop yield and quality. Progress has been made in the last few decades in identifying the nature and cause of sulphur deficiency in soils and in the creation of sulphur-based fertilizers or soil amendments. Some background is necessary on the relationship between sulphur types, their creation and the relationship to plant growth.

Sulphur, the tenth most abundant element in the universe, and is a component of many common minerals, such as galena (PbS), gypsum ($CaSO_4.2(H_2O)$), pyrite ($FeS_2$), sphalerite (ZnS or FeS), cinnabar (HgS), stibnite ($Sb_2S_3$), epsomite ($MgSO_4.7(H_2O)$), celestite ($SrSO_4$) and barite ($BaSO_4$). Nearly 25% of the sulphur produced today is recovered from petroleum refining operations and as a byproduct of extracting other materials from sulphur containing ores. The majority of the sulphur produced today is obtained from the processing of sour gas, usually found in conjunction with salt deposits, with a process known as the Frasch process. The Frasch process has proven too costly and when compared with more conventional processes.

Sulphur is a pale yellow, odorless and brittle material. Most of the sulphur that is produced is used in the manufacture of sulphuric acid ($H_2SO_4$). Large amounts of sulphuric acid, nearly 40 million tons, are used each year to make fertilizers, lead-acid batteries, and in many industrial processes.

Elemental sulphur ($S^o$) is a hydrophobic, insoluble particle that is dependent on microbial colonization of its surface and subsequent oxidation in order to be useable to plants. In other words, the primary form of sulphur that plants absorb through roots is in the sulphate form ($SO_4$). Elemental sulphur (or other types of inorganic sulphurs) is thus rendered "plant available" by oxidation to sulphates (for example calcium sulphate, potassium sulphate, ammonium sulphate).

The oxidation of $S^o$ to $SO_4$ in soil is a biological process and is carried out by several kinds of microorganisms. The rate at which this conversion takes place is determined by three main factors: 1) the microbiological population of the soil; 2) the physical properties of the $S^o$ source; and 3) the environmental conditions in the soil. Most agricultural soils contain some microorganisms that are able to oxidize $S^o$; however, the most important organisms in this respect are a group of bacteria belonging to the genus *Thiobacillus*. It is the numbers of these bacteria that generally determines the degree to which $S^o$ is converted to SO4 in soils, and there can be large differences between soils in the population density of *Thiobacillus*. Under laboratory conditions, the rate of $S^o$ oxidation in some soils can be markedly increased by inoculation with However, under field conditions, inoculation has not been found very effective. When a source of $S^o$ is added to a soil, it generally stimulates the growth of S-oxidizing bacteria, and the population of these organisms increases.

The physical property that has by far the greatest effect on the rate of $S^o$ oxidation is particle size. The finer the particle size, the larger the surface area exposed to soil microorganisms and the more rapid the oxidation process. Table 1 clearly shows this effect of particle size.

TABLE 1

Particle Size Affects Rate Of S Oxidation.

| Particle Size | % S Oxidized | |
|---|---|---|
| (Meshes/Inch) | 2 Weeks | 4 Weeks |
| 5-10 | 1 | 2 |
| 10-20 | 2 | 5 |
| 20-40 | 5 | 14 |
| 40-80 | 15 | 36 |
| 80-120 | 36 | 68 |
| 20-170 | 61 | 81 |
| 230 | 80 | 82 |

A mesh size of 5-15 is about the size range of bulk blended fertilizers and it can be seen that an S particle of this size is oxidized to $SO_4$ very slowly. In order for $S^o$ to be oxidized to the plant-available $SO_4$ form at even moderate rates, it must be of a very fine particle size. But finely divided S is very difficult to handle, in addition to posing a fire hazard under some conditions. All this would seem to largely rule out the use of $S^o$ as a fertilizer material.

Also, oxidation rates of elemental sulphur are slow in cold, dry soils and under other conditions which hinder the necessary oxidation process. This has led to considerable research in the area of enhancing this oxidation step by manipulating the particle size of elemental sulphur (there is faster oxidation the smaller the particle size).

Creation of micronized particles of elemental sulphur creates increased surface area for microbial colonization and hence oxidation. Fertilizer manufacturers have developed techniques to improve the handling characteristics and agronomic effectiveness of S°. Elemental sulphur is first ground to a very small particle size range and is then agglomerated to a particle size compatible with granular fertilizer materials. About 10-15% of an expandable clay is added during the agglomeration process. The resulting material is theoretically more easily handled than finely divided S. In theory, when such a particle is applied to a soil, it comes in contact with soil moisture. As this moisture is absorbed by the particle, the clay expands, which in effect breaks the particle down into a much finer size range. Naturally, there are costs associated with these pre-oxidation processes and micronization.

It is an object of the present invention to obviate or mitigate all of the above-noted disadvantages.

SUMMARY OF THE INVENTION

The present invention provides a process for producing a commercial soil additive comprising mixing a compost composition with an elementary (raw) sulphur to form a mixed material, turning the mixed material until the mixed material is substantially homogenous and until there is microbial oxidation of the elementary sulphur therein to at least one sulphate The present invention further provides an apparatus for producing a commercial soil additive comprising a reaction zone for mixing a compost composition with an elementary (raw) sulphur to form a mixed material, and a means to turn the mixed material.

The present invention further provides a soil amendment composition comprising a mixture of compost and at least one sulphate, wherein said sulphate was produced by microbial oxidative conversion of elemental sulphur in the presence of said compost.

The present invention further provides process for producing a commercial soil additive comprising loosely mixing a compost composition with a 90-99% elemental (raw) sulphur to form a mixed material and wherein said mixed material comprises 80-99.5% elemental sulphur, turning the mixed material, adding an extra 10-25% compost composition to the mixed material further turning the mixed material over time until the mixed material is substantially homogenous and until there is microbial oxidation of elementary sulphur therein to at least one sulphate therein to yield the soil additive. In a preferred form, the purity of the elemental sulphur can range from 80% pure elemental sulphur to 99.5% which is the specification of refinery produced sulphur.

The present invention further provides process for producing a commercial soil additive comprising loosely mixing a compost composition with a 90-99% elemental (raw) sulphur to form a mixed material and wherein said mixed material comprises 80-99.5% elemental sulphur, forming at least one of a static or dynamic pile comprising the mixed material, thereby forming a plurality of piles each with a top, adding an extra 10-15% compost composition to the top of each pile, turning and mixing the piles over time until the mixed material is substantially homogenous and until there is microbial oxidation of elementary sulphur therein to at least one sulphate therein to yield the soil additive. In a preferred form, the purity of the elemental sulphur can range from 80% pure elemental sulphur to 99.5% which is the specification of refinery produced sulphur.

There is provided herein a soil amendment or additive composition (similar to a fertilizer) that provides an all-natural combination to enhance performance of agricultural, home, and garden soils. The soil amendment of the present invention uses selective compost materials as its basic component and capitalizes on the existing microbial reactions, within the compost, to oxidize elemental sulphur to more plant accessible sulphates. The compost\organic matter greatly improves the overall health of the soil and enhances soil productivity and improved yields.

The invention provides, in a core aspect, a means to process various sources of elementary sulphur to easily produce plant accessible sulphates using microbes and microbial reactions within compost.

It has surprisingly been found that the process according to the present invention effectively converts elemental sulphur into plant accessible sulphates in a surprising and simple way. It is low cost and utilizes a readily available, secondary waste material (compost) in order to facilitate the process.

An important advantage of the process according to the present invention is that it enables the cost-effective reduction in particle size of elemental sulphur, which naturally then increases the rate of oxidation to sulphates.

BRIEF DESCRIPTION OF THE DRAWINGS

Embodiments of the invention are best understood by referring to the following description and accompanying drawings which illustrate such embodiments. In the drawings.

Figure 1:
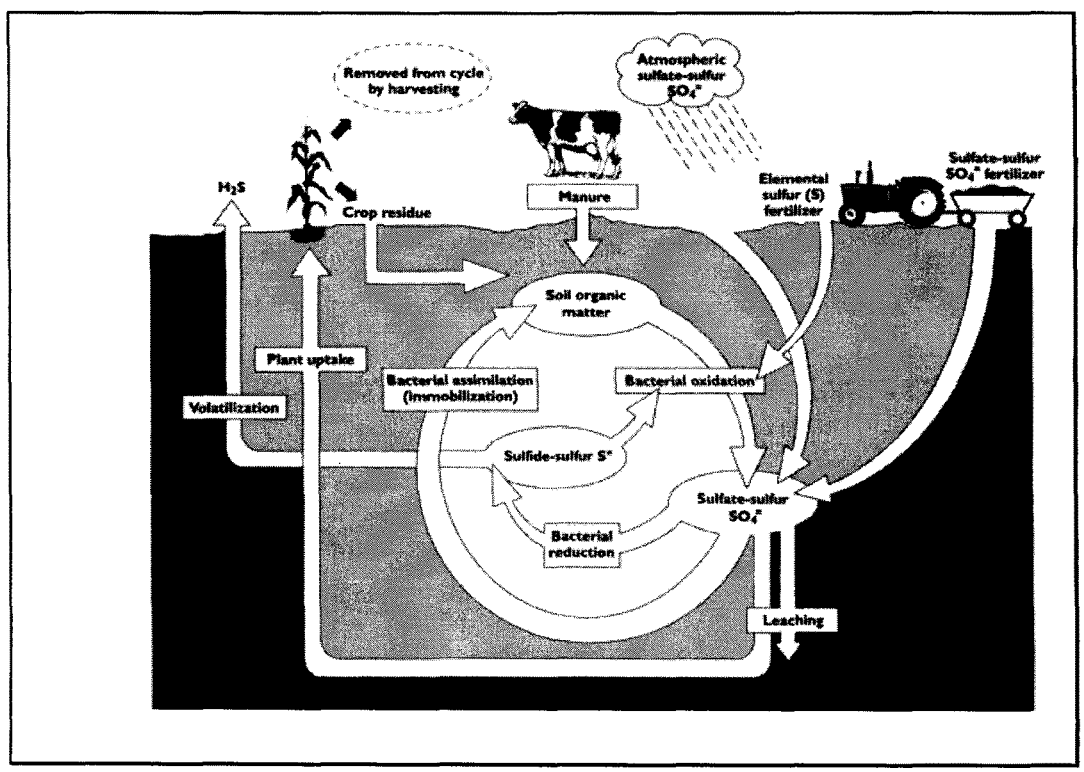
FIG. 1 illustrates the sulphur cycle.
Figure 2:
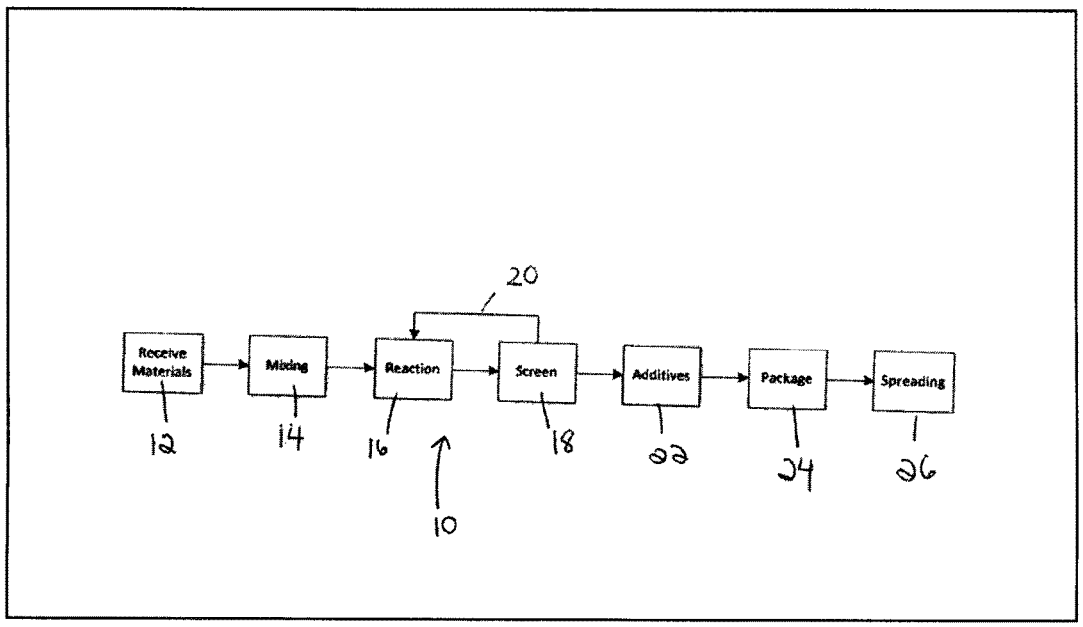
FIG. 2 illustrates a flow diagram depicting preferred steps of the present invention.

Reference will now be made in detail to certain claims of the invention, examples of which are illustrated in the accompanying structures and formulas. While the invention will be described in conjunction with the enumerated claims, it will be understood that they are not intended to limit the invention to those claims. On the contrary, the invention is intended to cover all alternatives, modifications, and equivalents, which may be included within the scope of the invention as defined by the claims.

PREFERRED EMBODIMENTS OF THE INVENTION

A detailed description of one or more embodiments of the invention is provided below along with accompanying Figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

In this specification the terms "comprise, comprises, comprised and comprising" and the terms "include, includes, included and including" are deemed to be totally interchangeable and should be afforded the widest possible interpretation.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The term "respective" and like terms mean "taken individually". Thus, if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

Any given numerical range shall include whole and fractions of numbers within the range. For example, the range "1 to 10" shall be interpreted to specifically include whole numbers between 1 and 10 (e.g., 1, 2, 3, 4, 9) and non-whole numbers (e.g. 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. section 1.72(b). The title of the present application and headings of sections provided in the present application are for convenience only, and are not to be taken as limiting the disclosure in any way.

The term "i.e." and like terms mean "that is", and thus limits the term or phrase it explains.

As used herein "compost" refers to mixture of decaying organic matter, including at least one of the following: biosolids, manure (for example from chickens, feed lots, pigs, cows cattle, etc. . . . ), municipal compost, municipal biosolids, food scraps, plant waste which is either "green" (leaves, flowers, weeds, grass cuttings) or 'brown' (bark, stems, roots, hedge trimmings). Compost can also include drywall or recycled wood chips. Compost is a living culture, a colony of macro and micro organisms that convert such above organic matter into "humus". At the simplest level, the process of composting simply requires making a heap of wetted organic matter (leaves, green matter, food waste) and waiting for the materials to break down into humus after a period of weeks or months. The decomposition process is aided by shredding the plant matter, adding water and ensuring proper aeration by regularly turning the mixture. Worms and fungi further break up the material. Aerobic and anaerobic bacteria manage the chemical process by converting the inputs into heat, carbon dioxide, sulphates, and ammonium.

As used herein "windrowed" is a process (and windrow, the means) by which organic matter or biodegradable waste is piled in long rows. These rows are generally turned to improve porosity and oxygen content, mix in or remove moisture, and redistribute cooler and hotter portions of the pile. A "windrow" is one such long row. Windrow formation is one preferred means, although not the only means by which the compost and elemental sulphur may be mixed and processed, as described further herein.

As used herein, "windrow turners" refer to a large machine that straddles a windrow. Turners drive through the windrow at a slow rate of forward movement. They have a steel drum with paddles that are rapidly turning. As the turner moves through the windrow, fresh air (oxygen) is injected into the compost by the drum/paddle assembly, and waste gases produced by bacterial decomposition are vented. The oxygen feeds the aerobic bacteria and thus speeds the composting process. There are other known turning apparatus for use in dynamic and semi-static composting systems.

The term $S°$ refers to elementary (raw) sulphur. The elemental sulphur used may be of varying purities. High purity (>99.9% S) chemical sulphur as obtained from the Claus process may be used. However, the process of the present invention can use elemental sulphur of significantly lower purity than this. Examples of such elemental sulphur containing materials are sulphur filter cake as obtained from sulphur melting and filtration operations and sulphur obtained from a various chemical and biological $H_2S$ gas removal processes. Typically, such sulphur sources may contain anywhere in the range of from 30 to 99.9 wt. %, preferably from 50 to 99.5 wt. %, more preferably from 60 to 99.0 wt. %, sulphur.

The term "$H_2SO_4$" refers to sulphuric acid, in aqueous solution.

The term "sulphate" refers to a chemical compound containing the bivalent group $SO_4$.

The term "$H_2S$" refers to hydrogen sulfide in gaseous form.

The term "sulfide" refers to a binary compound of sulphur with a metal.

Within the scope of the invention, "microbial oxidation" is performed by autotrophic, heterotrophic, chemoautotrophic, or decomposer microorganisms, including (without limitation) species of *Thiobacillus* (autotroph), heterotrophic bacteria such as *Pseudomonas, Arthrobacter, Bacillus* and some fungi.

In the oxidation of reduced sulphur compounds (such as elemental sulphur) in accordance with the invention, acidity is produced, along with sulphate as depicted in the following formula:

$$2S^0 + 3O_2 + 2H_2O \rightarrow H_2SO_4$$

The Problem

There is a need a) to process elementary sulphur into a usable form and 2) to produce a soil amendment product with sulphur in a form most readily accessible to plants.

Further, increased demand for sulphur-containing fertilizers stems from the discovery that low crop yields in certain cases may be related to deficiencies in sulphur in the soil. An example of a species with high sulphur requirements is Canola. Canola is an important cash crop in Alberta, Canada, and has high sulphur requirements at any growth stage. A shortage of sulphur can cause serious reductions in crop yield and quality.

Manufacturing processes for sulphur-containing fertilizers of the phosphate type often involve the use or incorporation of sulphates.

The sulphur cycle in agriculture is illustrated in FIG. 1, which shows organic sulphur and reduced sulfide sulphur (S) combined with oxygen to form available sulphate sulphur ($SO_4$) in warm, well-aerated soils. Available sulphate sulphur is tied up by bacteria during the decomposition of crop residues rich in carbon.

Harvesting and leaching removes sulphur from the sulphur cycle—crop removal varies from less than 10 lb/a of sulphur for grain crops to more than 20 lb/a for legumes and corn silage. Sulphate sulphur is not readily held by soil particles, except for acid clays, so in most soils it can be leached below the root zone. However, sulphate sulphur does not leach as readily as nitrate nitrogen, and some acid, clay subsoils contain sizeable reserves of available sulphate.

Soils commonly contain 200-600 lb/a of total sulphur. Nearly all is in the unavailable organic form. As organic matter decomposes, a small portion of this sulphur is converted into available sulphate sulphur. Approximately 2.8 lb/a of sulphur are released annually from each 1% organic matter in crop soils. Another source of un-applied sulphur is atmospheric contamination, which results from burning coal and, to a lesser extent, oil and gas. This atmospheric sulphur is washed from the air and deposited on the land in rainwater.

The Solution

There is provided a process for producing a commercial soil additive comprising mixing a compost composition with an elementary (raw) sulphur to form a mixed material and turning the mixed material until it is substantially homogenous and until there is oxidation of the elementary sulphur therein to at least one sulphate.

In a preferred form, there is provided a process for producing a commercial soil additive comprising mixing a compost composition with an elementary (raw) sulphur to form a mixed material, composting the mixed material by one or both of dynamic and static pile composting until the mixed material is substantially homogenous and until there is oxidation of the elementary sulphur therein to at least one sulphate So, in one aspect, the required mixing and turning may be accomplished by forming windrows and turning said windrows. This is by no means the only way in which the mixed material may be formed and turned. By the term "composting" as used herein, any one or combination of static or dynamic pile composting (whether either aerobic or anaerobic) may be employed and this includes windrowing.

Composting is a process driven by the activity of different (generally aerobic) microorganisms. Some microorganisms prefer temperatures between 55 and 65° C., others work better at temperatures below 40° C. The optimum reaction generally occurs at about 35-38 degrees C., most preferably at around 35 degrees C. It should be understood that the process of the invention operates at a range from 0-45 degrees, but optimally it occurs between about 35-38 degrees C.

In the microcosm of compost the compost material texture generally consists of three parts: solid phase (organic and inorganic particles), liquid phase (water) and gas phase (free air space between particles). Microorganisms settle on the surface of the solid phase. Everything they need for life and growth they receive via the liquid phase of the system, also oxygen. Thus it is preferred to provide sufficient and complete moistening of the solid phase of the system first. Second step is the adequate oxygen via the gas phase. Water and air sharing the "free space" between the particles and compete with each other. Maintaining a balance in this competition is one aspect of the composting process.

There are different known composting technologies which may be used in accordance with the process of the invention. The technological range of the available systems starts at simple open air windrow composting technology, which can be combined with under floor ventilation and/or membrane cover systems and ends at sophisticated in vessel systems with automatic process control.

Regardless of which technology is elected to be used, the various composting technologies are often classified in dynamic, semi dynamic and static technologies. The main characteristic to differ between those classes is the movement (or agitation) of the compost material.

Dynamic composting technologies are characterized by continuous movement of the compost material. A typical dynamic composting technology is drum composting, where the process takes place in a horizontal cylindrical vessel that rotates around its axle.

Semi dynamic composting technologies are characterized by frequent agitation (for example, more than one agitation per week), but discontinuous compost material movement (agitation). Among the semi dynamic composting technologies are agitated windrow, agitated bed and agitated lane composting.

Static composting technologies are characterized by non frequent compost material movement (for example equal or less than one agitation per week). Typical variations are aerated static pile composting and static tunnel composting.

It is well within the purview of a skilled artisan in this technical area to assess optimal turning, mixing and agitation. As noted above the demand for agitation is created by the need for maintaining the free air space in compost material. It is also well known that the microbiological activity as well as the biological degradation is higher at begin of the process and decreases towards its end. Compaction takes place much faster in the phase of high biological activity. As such, the demand for agitation may not always be constant over the whole processing time. For example, there might be a higher demand at begin of the process than at its end. From this point of view technologies with fixed agitation frequency, while workable, may be allow for optimal processing under all conditions. Also continuous agitation, like practiced in dynamic composting systems, may not allow an adaption of the agitation frequency to the demand. Systems with flexible agitation frequency, like many semi dynamic technologies, may offer an preferred option to agitate as often as needed.

In regards to turning, more time to react with sulphur makes more sulphate nutrient, and more moisture and time makes more sulphate and promotes more microorganism reactions.

Generally optimal composting is achieved in the shortest amount of time with a combination of aeration and turning. In one aspect the turning process can be done with a windrow-based arrangement. Turning may occur on a weekly basis which lowers the operating costs compared to a turned (unaerated) windrow system. The size of a windrow is dictated by the size of the windrow turner. Many windrow turners operate windrows that are up to 8 ft high and 20 ft wide. Some are up to 30 ft wide.

Aerated windrows outdoors, windrows with covers, or inside a building may be employed. As with the aerated windrow systems, the ideal floor for this process is having the aeration piping embedded in the concrete. A building structure can consist of a simple roof structure to keep precipitation from entering the composting material, or a completely enclosed and negatively ventilated building. Further detail on windrowed composting may be found at:
  i) http://www.frontierindustrial.net/frontier-compost-strategy.php
  ii) http://wwvv.transformcompostsystems.com/pdfs/Aerated %20Turned%20Windrows%20Salt%20Lake%20City.pdf
  (the contents of each of which are incorporated herein by reference)

Aeration of the windrow can be achieved through mechanical turning. Turning can also be done manually, but is considered impractical with volumes larger than one or two cubic meters. Uniform decomposition, as well as pathogen destruction, is best achieved by turning the outer edges into the centre of the pile at each turn. However, if this cannot be accomplished, the frequency of turning can be increased. Turning should also be more frequent than under a regular schedule when the moisture content of the pile is too high so as to minimize the development of anaerobic conditions. In areas that receive heavy rainfall, it may be necessary to cover the windrows so they do not become too wet; however, the cost of this may be prohibitive for certain operations. Alternatively, maintaining a triangular or dome shaped windrow is effective for shedding excess rain or preventing excess accumulation of snow in the winter. In windrow composting, the raw material is mixed and placed in rows, either directly on the ground or on paved or concrete surfaces.

During the active compost period, the size of the windrow decreases. Following the active period, windrows at the same level of maturity can be combined into larger rows, making additional space for more raw materials or compost. The equipment used for turning the windrow, varies from front-end loaders or bulldozers to specially designed turning machines. Loaders, although inexpensive compared to turners, have a tendency to compact the composting material, are comparatively inefficient, and can result in longer composting periods and less consistent quality. Pull-type, tractor driven power takeoff, compost turners may also be used. There are two basic types of windrow turners. The most commonly used have a series of heavy tines that are placed along a rotating horizontal drum which, turns, mixes, aerates and reforms the windrow as the machine moves forward. A second type uses a moving, elevator table chain equipped with sharp teeth. These windrow turners are either self-contained units that straddle the row, or are powered by a tractor driven power takeoff.

Windrows should preferably be turned frequently at first and then at longer intervals by the end of the first month. One (non-limiting) turning frequency program, is:

| 1st Week | 3 Turnings |
| 2nd Week | 2-3 Turnings |
| 3rd Week | 2 Turnings |
| 4th and 5th Week | 1 Turning each week |
| 6th and above | 1 Turning every 2 weeks (if heating still occurs) |

Temperature measurements inside the windrow may be used to gauge the need for turning to stimulate or control heat production. With efficient turning by using a windrow turner, a minimum composting time may be as little as one month, followed by on optional 1-2 months in a curing pile.

Using an aerated static pile method may not, under all circumstances achieve the desired level of aeration as there is no mechanical agitation of the compost material. The pile is for example constructed above an air source such as, perforated plastic pipes, aeration cones or a perforated floor; and aeration is accomplished either by forcing or drawing air through the compost pile. This system of aeration requires electricity at the site and appropriate ventilation fans, ducts and monitoring equipment. The monitoring equipment determines the timing, duration and direction of air flow. The pile should generally be placed after the floors are first covered with a layer of bulking agent, such as wood chips or finished compost. The material to be composted is then added, and a topping layer of finished compost applied to provide insulation. The optimum size of pile is related to the materials composted, air flow capabilities and the type of handling equipment. In some facilities, the initial mix is piled between temporary fencing or movable highway dividers. This allows considerable flexibility with respect to the size and location of the pile within the working area or building. In aerated static pile operations, the timing, duration and uniform movement of air are important. Air flow requirements change depending upon the materials composted, the size of the pile, and age of the compost.

All such systems may be used in accordance with the process of the invention.

Dry elemental sulphur has a neutral pH whereas wet sulphur with microbial activity will have a pH of around 2. This pH optimizes the process of the invention.

There is wide latitude in the exact amounts of the materials (raw compost vs elemental sulphur) in the composition to enable an oxidation reaction. This disclosure and claims are not limited to any ranges of amounts, due to this latitude.

In a preferred form, there is provided a process for producing a commercial soil additive comprising loosely mixing a compost composition with a 90-99% elementary (raw) sulphur to form a mixed material and wherein said mixed material comprises 80-85% elementary sulphur, turning the mixed material, adding an extra 10-15% compost composition to the top of the mixed material, further turning the mixed material over time until the mixed material is substantially homogenous and until there is oxidation of elementary sulphur therein to at least one sulphate therein to yield the soil additive.

In a further preferred form, there is provided a process for producing a commercial soil additive comprising loosely mixing a compost composition with a 90-99% elementary (raw) sulphur to form a mixed material and wherein said mixed material comprises 80-85% elementary sulphur, windrowing the mixed material, thereby forming a plurality of windrows, (in rows) each with a top, adding an extra 10-15% compost composition to the top of each windrow, turning and mixing the rows over time until the mixed material is substantially homogenous and until there is oxidation of elementary sulphur therein to at least one sulphate therein to yield the soil additive.

One aspect of the process of the invention is illustrated generally at 10 by flow chart in FIG. 1. Materials (compost composition with elementary (raw) sulphur) are received at reaction zone 12, mixed at zone 14 and reacted (preferably via windrows) at 16. Resultant product is screened at 18. Overs (post-screening) are returned to reaction zone 16 for further breakdown and processing (20). Additional nutrients are added at 22 and the final product spread at 26 (for example, using a modified lime spreader).

Example

Raw material (elemental sulphur) enters site and is weighed at the scale
- Pure sulphur (99% sulphur) or off-spec sulphur may be used (e.g. 95% or even less sulphur)
  - Raw material is typically at an estimated pH of 2: although this may vary. Dry sulphur has a neutral pH. If the raw material is mixed with water and begins to decompose then the pH is around 2

Sulphur is unloaded at the dedicated premix area on the compost pad

Mature compost is immediately added to each load and loosely mixed into the stockpile (diluting the product down to 80-85% Sulphur) formula may vary based on the specifications of the compost and or the sulphur
- Mature compost can be: biosolids, manure (chicken, feed lot, pigs, cows, cattle), municipal compost, other composts allowed via compost facility permit approval
- Mature compost is typically 40-45% moisture; typically pH of 6.8: although this may vary Mixed material from the stockpile is then windrowed (arranged in long piles) via tandem end dump and an extra 10-15% compost is added to the top of the rows
- Windrow piles are approx. 12 ft across×5 ft high; 10 ft apart
- Ratio of additional compost added could vary—higher compost proportion would produce varying nutrient ratios for final product
- Additional additives may be added here to speed the breakdown reaction in next step (e.g. could include carbon, numic acid)

The rows are turned/mixed with a loader attached Wildcat compost turner until homogenous. Each row is mixed twice and reacts for 2 to 8 weeks before screening
- Reaction time of 6 weeks is typical
  - Turning/mixing oxygenates material and improves aerobic bacterial breakdown reaction of raw sulphur material
  - Breakdown reaction is exothermic and takes place at ~35 degrees Celsius
  - Breakdown reaction is critical to conversion of elemental sulphur into softer, more "accessible" form (e.g. sulphate), and critical to facilitate mixing of sulphur and compost into a uniform product
  - Material left for longer time will breakdown further and will produce less over material from the subsequent screening step Mixed product is then put through a ⅜ inch trommel screen. Final product is the ⅜ minus product that comes off the fines conveyor. The overs are then put back into the process for further breakdown and processing. Approximately 25% of the first screen is over material which is returned to windrow piles for further processing
- Future target for process development is to produce a product which passes through "−80" mesh (more than 100 times smaller screen size than current ⅜ inch trommel screen)

Final composition of the soil amendment product is 70% sulphur/30% compost by weight although this formula may vary
- Final moisture level is ~25-30%, although moisture levels may vary
- Final pH of material is ~5-5.5 although pH levels may vary depending on the inputs
- Estimated sulphate level of final product is 5% This may vary greatly depending on the inputs used and their interactions with each other Additional nutrients could be added (e.g. NPK, carbon, humic acid, etc)

Product is spread using special equipment—modified lime spreader
- Currently spread at coverage rate of 250 lbs/acre although this may vary
- Coverage rate could vary based upon desired sulphur/compost ratio—specific ratios are developed to comply with land sulphur application regulations (e.g. max 215 lbs/acre of actual sulphur)

We claim:

1. A process for producing a commercial soil additive comprising:
   a) mixing a first compost composition with a source of elemental sulphur to form a mixed material, wherein the source of elemental sulphur comprises 90-99% elemental sulphur, said mixed material comprises 80-85% elemental sulphur;
   b) forming at least one of a static or dynamic pile comprising the mixed material, thereby forming at least one first pile;
   c) adding a second compost composition on top of the at least one first pile to form at least one second pile, wherein the second compost composition is 10-15% of the first compost composition; and
   d) turning the at least one second pile until the mixed material is substantially homogenous and until there is microbial oxidation of the elemental sulphur therein to at least one sulphate to form the soil additive.

2. A soil additive produced by the process of claim 1 wherein the soil additive is about 70% by weight sulphur and about 30% by weight compost.

3. The soil additive produced by the process of claim 1 wherein the soil additive has a moisture content of 25-30%.

4. The soil additive of claim 2 wherein the soil additive has a pH of 5-5.5.

5. The soil additive produced by the process of claim 1 wherein the sulphur in the soil additive has a sulphate level of about 5%.

6. The soil additive produced by the process of claim 1 wherein the soil additive further comprises additional nutrients selected from the group consisting of NPK, carbon, humic acid, and any combination thereof.

* * * * *